July 8, 1958

M. BRUCKER 2,841,826

METHOD FOR MOLDING PLASTIC

Filed May 1, 1953

MILTON BRUCKER,
INVENTOR.

HUEBNER, BEEHLER,
WORREL & HERZIG,
ATTORNEYS.

BY Herbert M Herzig

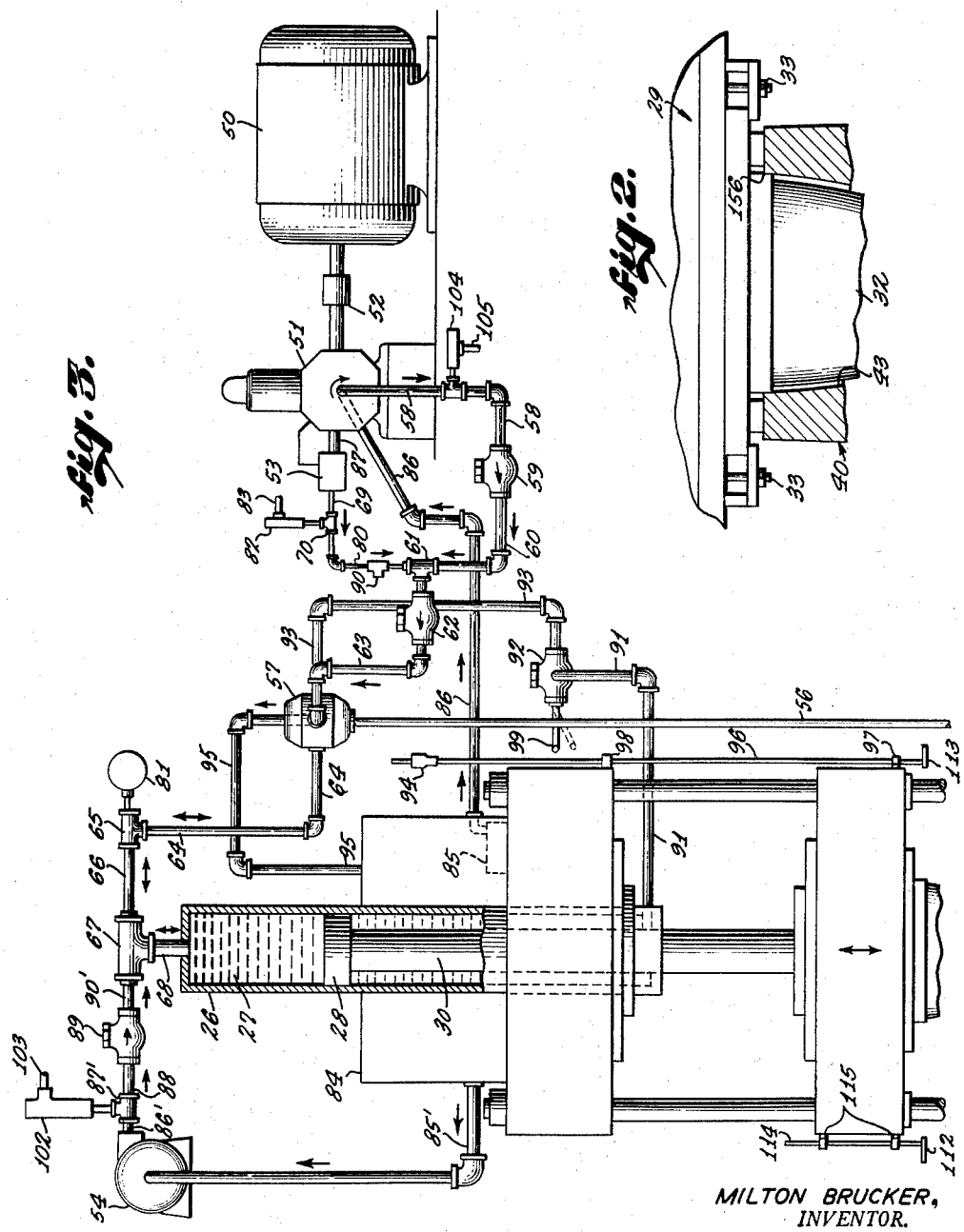

July 8, 1958
M. BRUCKER
2,841,826
METHOD FOR MOLDING PLASTIC
Filed May 1, 1953
3 Sheets-Sheet 3
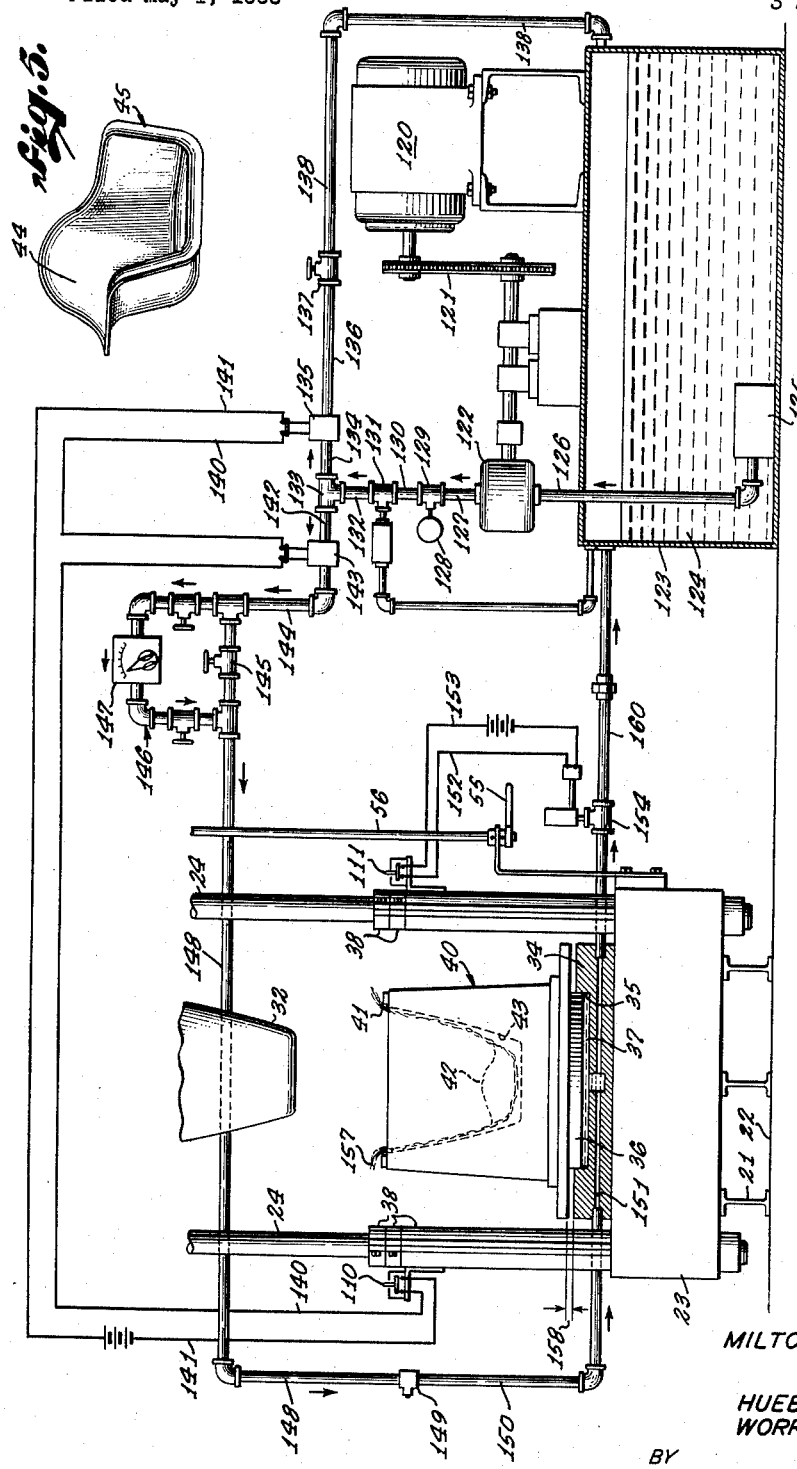
MILTON BRUCKER,
INVENTOR.
HUEBNER, BEEHLER,
WORREL & HERZIG,
ATTORNEYS.
BY 0# United States Patent Office 2,841,826
Patented July 8, 1958

2,841,826
METHOD FOR MOLDING PLASTIC

Milton Brucker, Los Angeles, Calif., assignor, by mesne assignments, to Zenith Plastics Company, Gardena, Calif., a corporation of Delaware Application May 1, 1953, Serial No. 352,468

1 Claim. (Cl. 18—55)

This invention relates to molding of plastic resin, and relates particularly to a new and improved method for applying to a thermosetting resin a final, slow but forceful molding pressure especially adapted for deep drawing of reinforced, laminated or fiberglass-impregnated resinous bodies, and the like.

In the formation of such a reinforced resin, if tearing or washing of the pre-form is to be avoided, the maximum molding pressure, say 300 pounds per square inch, applied to the resin must be achieved before curing begins and not subsequent to the time when the compression dies have been brought to a position of maximum closure.

The time within which any particular resin begins to set is known to those skilled in the art and may vary, for example, over a wide range of time. Some resins, however, which cure in less than a minute, or in which incipient polymerization occurs within a few seconds, say, two to sixty seconds, after contacting the heated dies, may have begun to set prior to the imposition of maximum desired curing pressures, unless a prompt if not immediate build-up of such desired maximum pressure is achieved.

Inasmuch as hydraulic presses are the apparatus of choice, especially in large molding operations, the improvement of such presses to achieve the desired maximum pressures at the earliest possible moment has proved a critical factor in the production of satisfactory molded parts. It has been found, for example, that hydraulic fluid has a degree of compressibility which, in presses of prior art construction, takes an excessive amount of time to overcome. This is due in part to a conventional practice of delivering a relatively lesser flow of hydraulic fluid to the hydraulic cylinder to slow down the press immediately prior to engagement of the dies, as is necessary to prevent shock or sudden impact. Such low volume oil or other hydraulic fluid delivered at or near the end of the stroke, even though delivered to the hydraulic cylinder under sufficient pressures, does not overcome the compressibility of the fluid until after a significant time delay.

Such delay is not overcome by the mere substitution of a second hydraulic system, whether smaller or larger than the first, but rather is dependent upon a second hydraulic or other type of substituted means characterized by a maximum pressure build-up (but without shock) at the earliest possible moment in the final closing movement of the dies.

By way of example, a polyester thermosetting resin of the character of Paraplex (commercially available from Rohm and Haas) or Selectron 5084 (commercially available from Pittsburgh Plate Glass Company) has an incipient gelling time of from 30 to 40 seconds at a die temperature of 230° Fahrenheit. The resin, for the best final product, must be wholly compressed before gelling begins.

If a hydraulic press is employed, in which the hydraulic fluid requires say twelve to fifteen seconds to reach full compression at a required 2,000 pounds per square inch, the dies' travel may have been retarded by resistance in the resinous material, and/or its reinforcement, and incipient gelling may be at hand before the final closing movement of the die is possible, because of delayed achievement of the required maximum molding pressure.

In such event, the final closing movement of the dies will occur after the resin has begun to set, and an imperfect part, characterized either by washing or tearing of the resin and/or its reinforcing fibers, results. Cracking, breaking or weakening of the partially cured resin, may also result. In addition, the molded surface of the finished product will be less glossy, uneven, weakened, pitted, or subject to wear and erosion.

The above illustration bears more favorably upon some prior art practices and less favorably upon others. In some instances, the delay in maximum pressure build-up may be longer than the time necessary for achieving an incipient cure, in which case the relatively poor nature of the resulting product will be even more apparent.

The importance of preventing a time delay in maximum pressure build-up is further high-lighted by the following considerations:

Assume a laminate or pre-form be laid between the mating mold halves, or draped over, or otherwise disposed in or upon one of the mating mold halves, in accordance with conventional practice. And assume a resin of the character of those above mentioned, poured over the laminate or pre-form in a relatively viscous, honey-like consistency.

Upon contact with the heated mold, the viscosity of the resin will initially drop to an almost water-like consistency, during which time it best wets the laminate or pre-form.

On the one hand, it is desirable that the wetting occur over the longest possible time to assure the best distribution of the resin through the reinforcement. But on the other hand, it is necessary to close the dies completely before the resin begins to set. Accordingly, it is preferable that the molds be fully closed precisely at the instant that gelling begins—as a matter of practice, within two or three seconds before gelling begins.

In thus timing the closing of the mold with the beginning of gelling, it is important that substantially full final molding pressure be in the last closing movement of the dies, so that resistance in the molded parts will not delay final closing of the die, under full hydraulic pressure, until after gelling has begun.

Where pre-shearing of the edges of the molded parts, specifically, pre-shearing of any excess laminate or pre-form, is required, then, in the prior art, a pre-shearing operation is initially required, whereas in the instant method and apparatus, pinch-off is permissible, in, for example, the last sixteenth of an inch of die travel, i. e., in the final closing movement of the die. Such terminal shearing is safely accomplished in the practice of the instant invention, because the required maximum operating pressures are already at hand. No significant time-lag for such maximum hydraulic pressure build-up will be required so as to adversely affect movement of the die, as stated, after gelling has set in.

This invention has among its objects the provision of improvements over prior art methods heretofore intended to accomplish generally similar purposes.

It also has among its objects the achievement of the above stated desired results, and the avoidance or mitigation of some of the above recited defects in prior art means and methods.

This invention more specifically has among its objects the provision of a new and improved hydraulic press construction for the intended purposes, among others, whereby early, substantially maximum, operating pressures are maintained during the effective molding travel of the press against a resistance created by the work, including final flow of the resin and terminal cutting movement if desired.

Also among the objects of the invention is the provision of a new and improved molding method particularly adapted for forming, drawing and compressing, and optimum curing of reinforced resinous sheets and other parts, to achieve the results and avoid the difficulties above referred to and as indicated hereinafter.

With these and other objects in view, the invention consists of the construction, arrangement and combination of the various parts of the device, and steps of the process, whereby the objects contemplated are attained, as hereinafter set forth, pointed out in the appended claim, and illustrated in the accompanying drawings.

In the drawings:

Figure 2 is a detailed vertical sectional view of a set of dies of a type usable in practicing the instant invention.

Figure 3 is a schematic view of the upper portion of the press of Figure 1 and the piping and pressure system associated therewith.

Figure 4 is a corresponding view of the bottom portion of the press of Figure 1 and the piping and pressure system associated therewith.

Figure 5 is a perspective view of a molded part in the form of a chair seat which may be made by practicing the instant invention.

Figure 1:
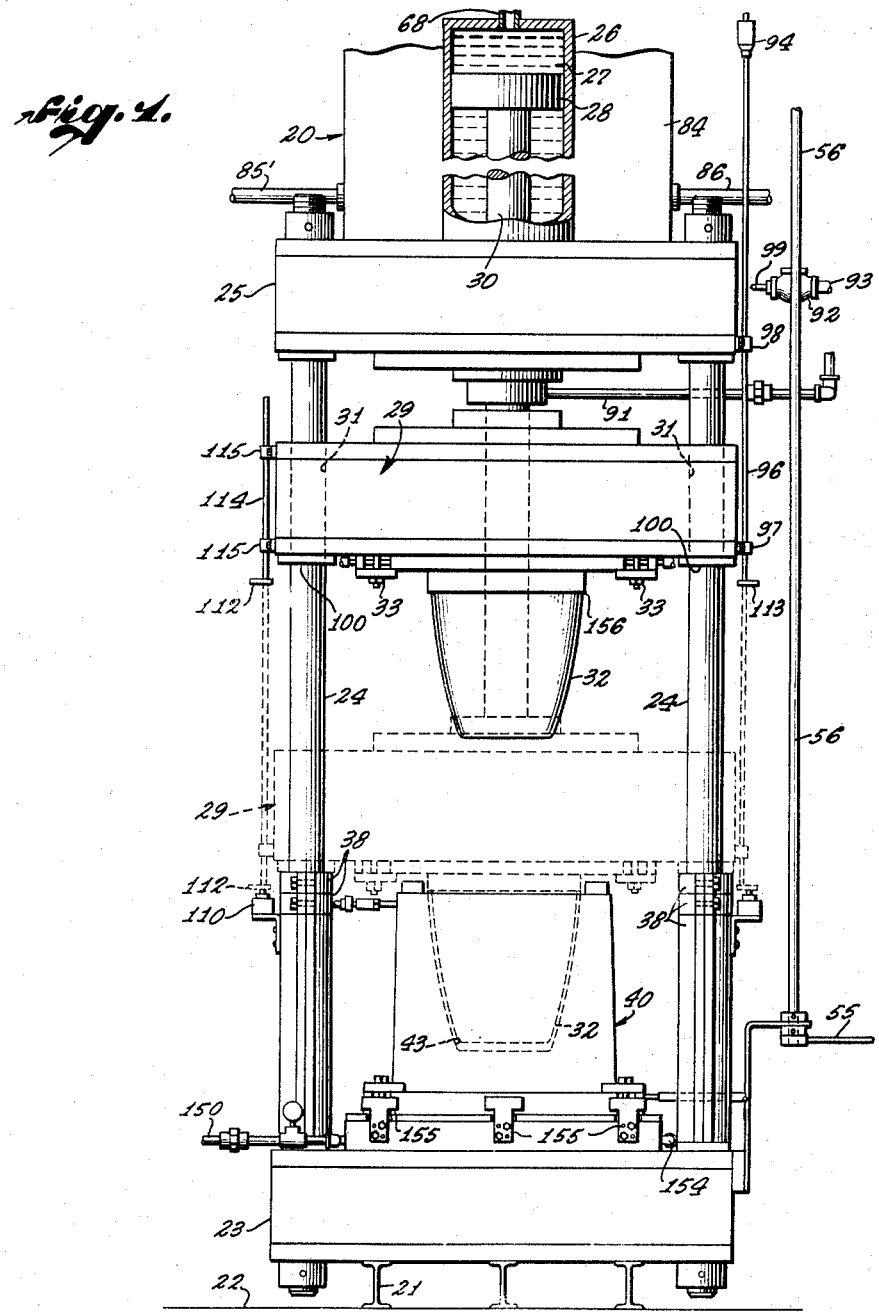
Figure 1 is a front elevational view of a hydraulic press embodying this invention.

Referring more particularly to the drawings, there is shown by way of illustration but not of limitation a hydraulic press (Figure 1) generally designated at 20, comprising a frame 21 supported as on a floor 22, and mounting a stationary platen 23, the latter mounting a pair of guide rods 24 at the upper end of which is fixedly secured a transverse stationary frame member 25. A cylinder 26 containing hydraulic fluid 27 mounts a piston 28 for vertical reciprocal movement therein, to control a moving platen 29 by means of a plunger rod 30. The moving platen 29 is guided on the rods 24, as at 31.

The upper platen 29 carries, for example, a male die member 32, removably positioned thereon and depending therefrom by means of any suitable securement such as bolts 33.

The lower platen 23 has a lower cylinder 34, including a bore 35, in which a short piston 36 is mounted for vertical reciprocal movement under the influence of another body of hydraulic fluid 37.

Adjustable stop collars 38 are replaceably mounted on the lower platen 23 and are clamped around respective rods 24 to provide a limit for the downward movement of the moving platen 29 and its die portion 32.

The structure and arrangement of the remaining parts of the apparatus will best be considered in connection with their use, as follows:

In use, a female die portion 40, for example, is overlaid with any number of layers or amount of resin-reinforcing material such as pre-form in the form of fiberglass fibers which have been blown on a screen and bound together as a sheet by means of a suitable binder, woven fiberglass cloth, or the like, 41.

A quantity of resin, preferably a thermosetting polyester type of the character, for example, of Selectron, heretofore mentioned, 42, is poured into the mold cavity 43 over the fibers 41, which as stated may be sheet-like in their preferred form, but also may comprise any known resin-reinforcing fiber or other material, whether reticulate, woven or loose.

The dies 32, 40 are heated in a conventional manner, not shown, to a temperature in the example under consideration of preferably 240° Fahrenheit for the male portion 32, and 235° Fahrenheit for the female die portion 40. The selected example of the article (Figure 5) is in the form of a molded chair body 45, as illustrated in Figure 5, in which it is assumed the inner surface 44 will receive the most wear, hence will be given a slightly higher heat and resultant glossier finish.

The dies 32 and 40 are initially in their utmost position of separation with the die 32 being elevated as to a position shown in solid outline in Figure 1 and the piston 28 at the top of the cylinder 26. For continued operation of the apparatus, a motor 50 continuously operates a pump 51, through a shaft and coupling 52, and also continually operates another pump 53. The pump 51 delivers, for example, 300 gallons per minute, at approximately 400 lbs. per square inch pressure, while the pump 53 delivers a lower volume of say, one to one and one-quarter gallons per minute at a higher pressure of say, 2,000 lbs. per square inch.

Another pump 54 also continuously operated by any suitable motor, not shown, delivers a high relative volume of say, 80 gallons per minute at approximately 50 to 60 lbs. per square inch pressure.

When it is desired to move the die 32 downwardly, an operator turns a handle 55, which acts through a shaft 56 to control a four-way valve 57 in a manner to connect the pump 51 to the upper cylinder 26 to depress piston 28, through pipe 58, check-valve 59, pipe 60, T 61, check-valve 62, pipe 63, said four-way valve 57, pipes 64, T 65, pipes 66, T 67, and inlet pipe 68, to the cylinder 26.

Simultaneously the pump 53 is also connected to said upper cylinder 26, as through pipe 69, T 70, pipe 80, check-valves 90, said T 61, said cylinder 26, by way of the check-valve 62, and the piping aforesaid. A pressure gauge 81 may be connected to the T 65. A relief valve 82 is connected to the T 70. From the relief valve 82 a pipe 83 returns to a storage tank 84, the latter supplying said pumps 51 and 53 as through a strainer 85 and pipes 86 and 87, respectively.

Simultaneously with the downward movement of the piston 28 the pump 54, as through pipe 85' leading from the storage tank 84 and pipe 86', T 87', pipe 88, check-valve 89, pipe 90', and said T 67 and inlet pipe 68, supplies the oil or other hydraulic fluid 27 in the relatively large volume of say, 80 gallons per minute at the low pressure aforesaid, there being no pressure required in the free initial descent of the platen 29.

When the piston 28 descends, the fluid thereunder is normally led as through pipe 91, deceleration valve 92, pipe 93, said four-way valve 57, and pipe 95, to the tank storage 84. An adjustable vertical rod 96 supported in clamps 97 and 98, the latter clamp 98 being slidable relative to the rod 96, is carried downwardly with the moving platen 29 and carries a cam member 94, whose engagement against a rod 99 moves said rod to the right as shown in Figure 3, to decrease the flow therethrough so as to decelerate piston 28 immediately prior to the engagement of stop 100 on the bottom of the moving platen 29, with the corresponding stop collar 38 which halts further downward movement of the platen 29 carrying said male die member 32.

Upon such stoppage of the platen 29, or even at said deceleration thereof, the check valve 89 associated with the pump 54 closes by virtue of the greater pressure exerted on the fluid from the pumps 51 and 53, and the flow from said pump 54 is then through a relief valve 102, set as to said pressure of 50 to 60 lbs. per square inch, and by pipe 103 back to the storage tank 84.

The pump 51 continues to deliver oil to the cylinder 26 until the pressure therein reaches the 400 lbs. per square inch rating of that pump, whereupon the check valve 59 closes, by virtue of the greater pressure exerted through the pump 53, which continues to deliver oil through the T 61 and check valve 62 until the 2000 lbs. per square inch setting of the relief valve 82 associated therewith causes return of the remaining hydraulic oil fluid to the tank 84 through pipe 83. A similar relief valve arrangement 104 operates to return the oil through pipe 105 to the tank 84 upon said pump 51 delivering its said maximum pressure.

The pressure within the cylinder 26 above the piston 28 is thus successively built up to the desired maximum pressure required to exert the intended pressure upon the male die 32, for forming the product (e. g., Figure 5).

Due, however, to the relatively large volume of the cylinder 26 required for the long downward movement of the platen 29—to afford operating room between the dies in their open position—the capacity of said cylinder is approximately, for example, 30 gallons. Since the hydraulic oil fluid 27 has a compressibility of approximately one-tenth of a gallon per throusand pounds per square inch, approximately twelve seconds would normally be required to build up the pressure therein to the desired final molding pressure of 2,000 lbs. per square inch, said time for final pressure build-up being minimized by the hereindescribed arrangement.

Assuming the resin gell time is approximately 40 seconds, it is desired to further cut down the time lost through the compressibility of the hydraulic fluid in order to gain additional time for more thorough wetting of the reinforcing material 41 with the resin 42 in its low viscosity condition, and also to avoid the undesirable possibility that the delay in final pressure build-up will—due to compressibility of the oil—occur near or coincident with the beginning of gelling.

Accordingly, micro-switches 110 and 111 are supported along the rod 24 preferably adjacent the stop collar 38, so as to be engaged by fingers 112 and 113 respectively, carried at the bottom of a rod 114 adjustably supported as by brackets 115 upon the moving platen 29, and at the lower end of the rod 96. The micro switches energize electrical circuits for operating valves in a manner and for a purpose to be described.

For moving the lower piston 36, a motor 120 operates as through a sprocket drive 121 for continuously driving a pump 122 which is rated at say, 10 gallons per minute and 1,000 lbs. per square inch of pressure, but which is used, for example, at 300 lbs. per square inch to deliver two or three gallons per minute.

Prior to the engagement of said finger stops 112 and 113, with the micro-switches 110 and 111, the pump 122 draws from a reservoir 123, having hydraulic fluid 124 therein, through any suitable strainer 125, and pipe 126, and delivers via a pipe 127, which path includes, for example, a pressure gauge 128, and also via T 129, pipe 130, T 131, pipe 132, T 133, pipe 134, normally open solenoid valve 135, pipe 136, including a manually operable valve 137, and pipe 138.

Upon engagement of said finger 112 with the micro-switch 110, a circuit is closed through conductors 140 and 141 to close the solenoid valve 135, thereby causing a flow from said T 133 through a pipe 142, and opening, by said electrical circuit, a solenoid valve 143, otherwise normally closed. From the pipe 142 the flow is through pipe 144 via a direct line including a manually operated valve 145, and/or via a bypass 146 including a volume control valve 147, thence through pipe 148, spring loaded check valve 149, pipe 150, and passageway 151 communicating with the bore 35.

Simultaneous engagement of the micro-switch 111 by said stop finger 113 closes an electrical circuit 152, 153, through solenoid-operated normally open check valve 154, which is thereby closed so as to permit the build up of hydraulic pressure under the piston 36.

It has been found advantageous, for example, to have an area of approximately 113 square inches for the top of the piston 28 while imposing thereon a force of approximately 100 tons. The piston 36 may, in such event, have an area of approximately 625 square inches.

Thereby the pressure exerted by the pump 122 may be built up with approximately one-fifth to one-sixth the amount of pressure in the fluid 124 to achieve an equivalent upward thrust by the female die 40. Such upward thrust is preferably somewhat less than the downward force exerted by the upper piston 28 in order that the lower piston 36 will not force the upper piston 28 upwardly off its stops 38.

The desired pressure can thereby be built up under the lower piston 36 in a fraction of the time which would be required to build it behind the upper piston 28, due to said greater area of the smaller piston, the lower pressure of the oil thereunder, the lower volume of said oil, e. g., approximately three gallons to move the lower piston 36 upwardly, for its customary half-inch stroke, as limited by stops 155, and the relatively negligible resultant compression of its oil.

In view of the improved pressure and time factors, the pinch-off structure 156 around the edge of the dies, which usually operates in the last sixteenth of an inch of die travel, may be accomplished without the heretofore required preliminary separate shearing stroke as required to remove the excess resin-reinforcement 157, which was heretofore also ordinarily required for venting of larger size molds such as those under discussion.

The closing movement of the lower piston 36 throughout its travel indicated by the lines and arrows 158 in Figure 4, is ideally slow and occupies a time interval of approximately 30 seconds in the example in question, with a negligible time loss of approximately three seconds for fully compressing its oil at the upper end of its stroke.

The dies thereafter remain closed approximately two minutes to complete polymerization.

Thereafter, manipulation of the operating handle 55 turns the valve 57 so that said flow from the pumps 51 and 53 via the check valve 62 passes through the deceleration valve 92 and thence into the cylinder 26 below the piston 28 to raise the same. It also simultaneously interconnects said cylinder above the piston through pipes 66 and 64, said valve 57 and pipe 95 with the reservoir 84.

As the platen moves forwardly, the fingers 112 and 113 disengage the micro-switches 110 and 111, the latter permitting the opening of the solenoid valve 154, whereby the lower die portion 40 descends by its own weight and the fluid thereunder moves into the reservoir 124, as through pipe 160, upon which another cycle may be started.

This invention features a molding process characterized by a rapid build-up of maximum operating pressure to overcome any die resistance. The dies in the last portion of the compression stroke, and while the viscosity of the resin is low, move slowly and with maximum force in a manner to prevent washing of the reinforcing fibers as occasioned either by too rapid movement of the die or too early a movement thereof before the viscosity of the resin has an opportunity to drop.

The invention also features a method of operation wherein die movement is controlled within rigid narrow time and motion limits so that optimum wetting and flow of the resin relative to the reinforcing fibers thereof is achieved. Die closing at the end of the compression stroke is safely timed to closely approach the instant at which gelling of the resin begins. Danger of die movement after gelling has begun—heretofore occasioned by the time required to build up to full pressure due to compressibility of the hydraulic fluid—can be substantially eliminated and longer wetting times obtained.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claim so as to embrace any and all equivalent structures and methods.

I claim:

The method of molding a large-area article from a thermosetting plastic resin material having a short incipient gellation time wherein a heated mold is initially charged with material comprising said plastic and a fibrous reinforcing material, the steps of: setting one side of the mold in an initial rapid movement to a stop position short of closing of the mold and with a force less than that required for final molding, to heat and press said resin to fill the mold cavity; holding said one side at said stop position; and immediately thereafter closing the mold by setting the other side thereof in a final movement with a force at all times substantially equal to the required final molding pressure and in a time interval expiring before commencement of gellation of said resin.

References Cited in the file of this patent

UNITED STATES PATENTS

| | | |
|---|---|---|
| 500,047 | Anderson | June 20, 1893 |
| 1,210,664 | Malinovszky | Jan. 2, 1917 |
| 1,400,913 | Schelhammer | Dec. 20, 1921 |
| 2,200,998 | Schnuck | May 14, 1940 |
| 2,320,759 | Stacy | June 1, 1943 |
| 2,480,313 | Alden | Aug. 30, 1949 |
| 2,495,640 | Muskat | Jan. 24, 1950 |
| 2,541,297 | Sampson et al. | Feb. 13, 1951 |
| 2,711,561 | Studli | June 28, 1955 |
| 2,718,663 | Roger | Sept. 27, 1955 |